(12) United States Patent
Yaple

(10) Patent No.: US 7,857,336 B1
(45) Date of Patent: Dec. 28, 2010

(54) AIR SUSPENSION SYSTEM

(76) Inventor: Winfred E. Yaple, 645 Fogg, Las Vegas, NV (US) 89110

(*) Notice: Subject to any disclaimer, the term of this patent is extended or adjusted under 35 U.S.C. 154(b) by 583 days.

(21) Appl. No.: 11/827,431

(22) Filed: Jul. 10, 2007

Related U.S. Application Data

(60) Provisional application No. 60/831,002, filed on Jul. 14, 2006.

(51) Int. Cl.
*B60G 9/04* (2006.01)
(52) U.S. Cl. .......................... 280/124.157; 280/124.16
(58) Field of Classification Search .......... 280/124.157, 280/124.158, 124.159, 124.16
See application file for complete search history.

(56) References Cited

U.S. PATENT DOCUMENTS 7,559,396 B2 * 7/2009 Schwindt ..................... 180/227

* cited by examiner

*Primary Examiner*—Faye M. Fleming
(74) *Attorney, Agent, or Firm*—Robert Ryan Morishita; Morishita Law Firm, LLC

(57) ABSTRACT

An air suspension device includes a housing enclosing a compressor chamber that communicates with an air source and at least one piston chamber, optionally through internal air ports. A compressor is disposed in the compressor chamber. When the compressor is driven by a power source, such as a motor, the compressor draws air from the air source and drives the air into the piston chamber. A piston disposed in the piston chamber is cushioned by the pressurized air.

20 Claims, 7 Drawing Sheets

AIR SUSPENSION SYSTEM

RELATED APPLICATION DATA

The present application claims the priority of U.S. Provisional Application Ser. No. 60/831,002, entitled "Air Suspension System," filed Jul. 14, 2006 by Applicant herein.

FIELD OF THE INVENTION

The present invention relates to motor vehicle suspension systems. Specifically, the present invention is a motor vehicle air suspension system having an incorporated compressor and internal porting.

BACKGROUND OF THE INVENTION

Many types of motor vehicles, such as motorcycles, all-terrain vehicles ("ATVs"), and the like, utilize suspension systems. Suspension systems come in many forms, such as the familiar damper/spring systems and air suspension systems. For example, air suspension systems, particularly aftermarket air suspension systems, exist that include a pair of pistons and a compressor. However, these systems suffer from certain drawbacks. One drawback of such systems is that the compressor is separate from the pistons. This can lead to leakage at the joints, fittings, and lines connecting the compressor and the pistons. Another problem arises in locating the lines and compressor on the motor vehicle so that both are protected from being dislodged or disconnected. This problem is compounded on motor cycles, ATVs, or the like where space may be limited.

Therefore, there is a need in the art for motor vehicle air suspension system that is more compact in size and limits the potential points where leakage or disconnection can occur.

SUMMARY OF THE INVENTION

The present invention includes an air suspension device. In an optional embodiment, the present air suspension device is directed for use on a motorcycle. An air suspension device according to the present invention includes a housing that encloses a compressor chamber that communicates with an air source, such as ambient air, and at least one piston chamber. Optionally, the communication between the compressor chamber and one or more piston chambers is internal to the housing. The compressor chamber includes a compressor disposed therein and a check valve. The compressor may be driven by any power source; in an optional embodiment, the compressor is driven by a motor mounted on the housing connecting to the compressor through a linkage. In such an optional embodiment, the compressor draws air from the air source and delivers it, under pressure, to one or more piston chambers.

Optionally, a solenoid valve communicating with the compressor chamber may control the flow of compressed air from the compressor chamber. In one such optional embodiment, a restricting valve cooperates with the solenoid valve to control the rate of flow of compressed air from the compressor chamber.

In an optional embodiment including an electric motor and a solenoid valve, the wires delivering electricity to the solenoid and motor may terminate in a connector.

A piston is disposed in each piston chamber with a piston rod extending from the housing. The housing includes mounts so that the air suspension device can be mounted between a wheel assembly and frame element. In an optional embodiment, the mounts on the housing are mounted to a frame element of a motorcycle and the piston rods are mounted to a wheel assembly. In such an optional embodiment, the port communicating compressed air from the compressor to the piston chamber is optionally disposed on the side of the piston proximate the piston rod so that compressed air introduced into the piston chamber by the compressor forces the piston and piston rod into the piston chamber. In an optional embodiment, a vent may communicate with the side of the piston opposite the piston rod. In one such optional embodiment, a relief valve may be disposed in the vent to control the flow of air through the vent.

DESCRIPTION

Figure 1:
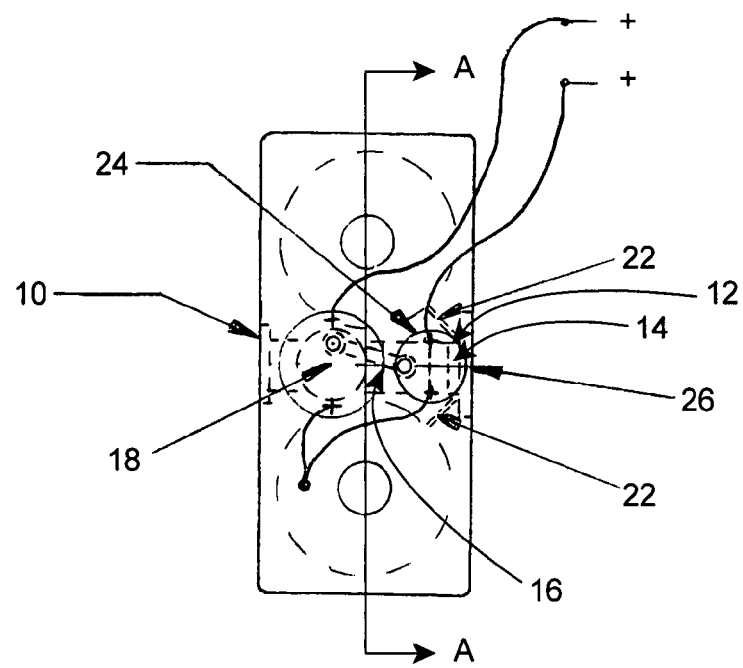
FIG. 1 is a left side view of a device according to an embodiment of the present invention.
Figure 3:
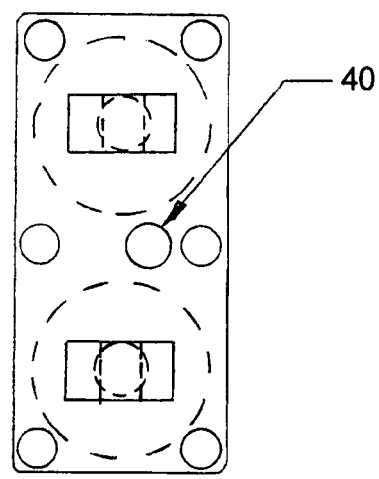
FIG. 3 is a right side view of a device according to an embodiment of the present invention.
Figure 2:
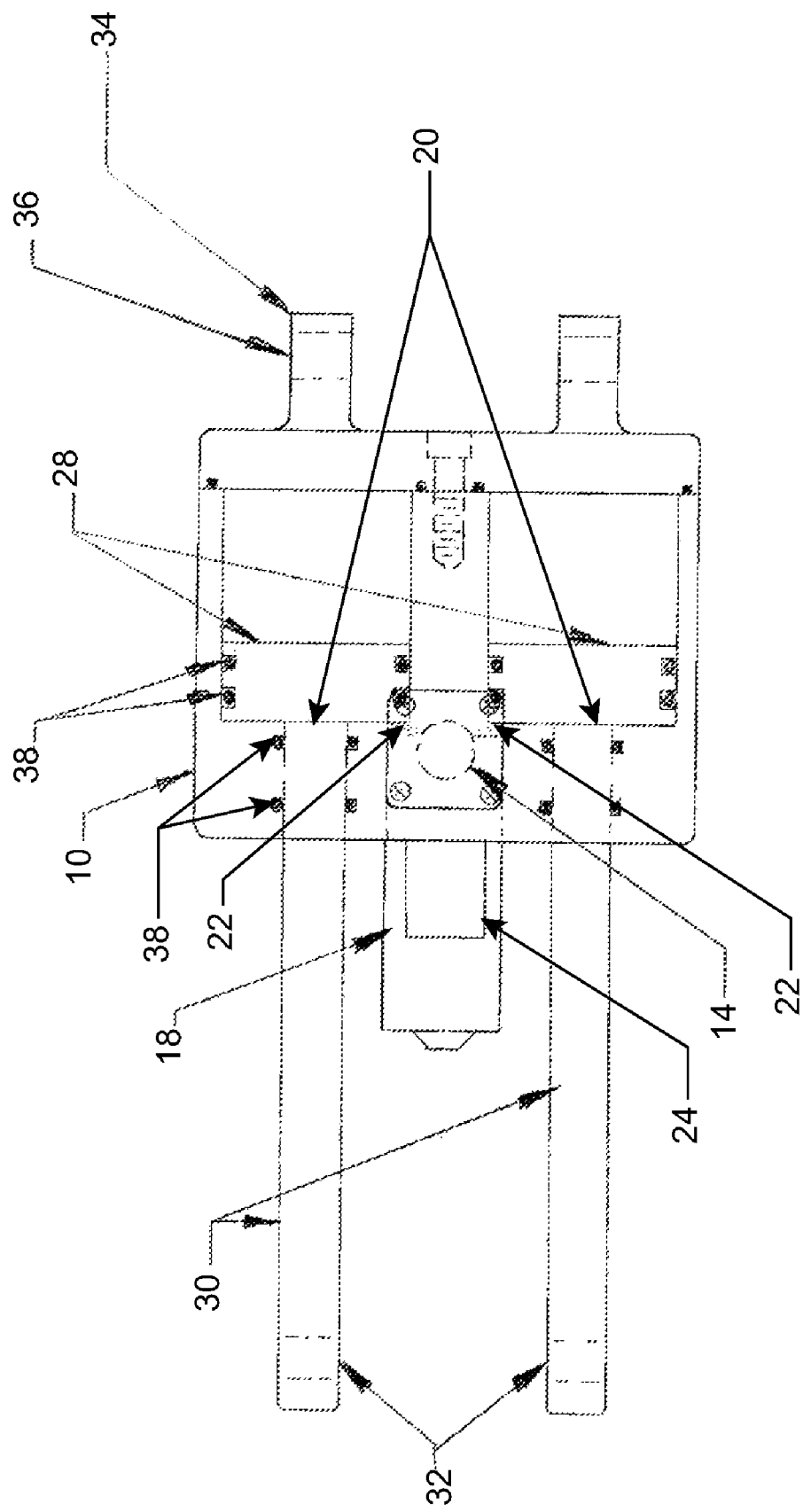
FIG. 2 is a cutaway front view of a device according to an embodiment of the present invention taken along section line A-A of FIG. 1.

Reference is now made to the figures wherein like parts are referred to by like numerals throughout. Referring generally to FIGS. 1-3, the present invention includes an air suspension device for a motor vehicle. While the present invention could be adapted to many uses, in an optional embodiment, the air suspension device may be adapted for use with any type of motor vehicle, such as motorcycles, ATVs, and the like.

Figure 4:
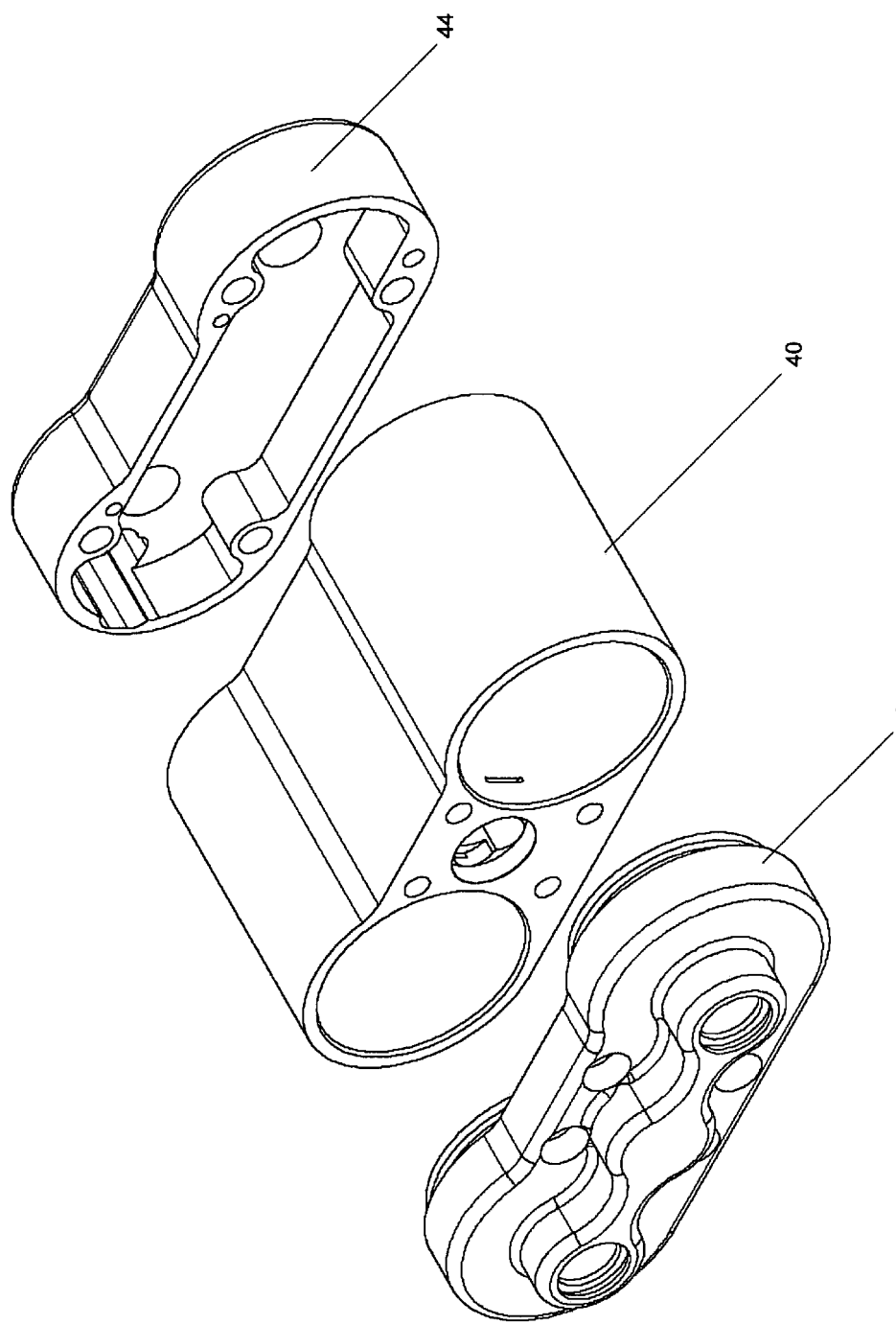
FIG. 4 is an elevated perspective assembly view of the housing of a device according to an embodiment of the present invention.
Figure 5:
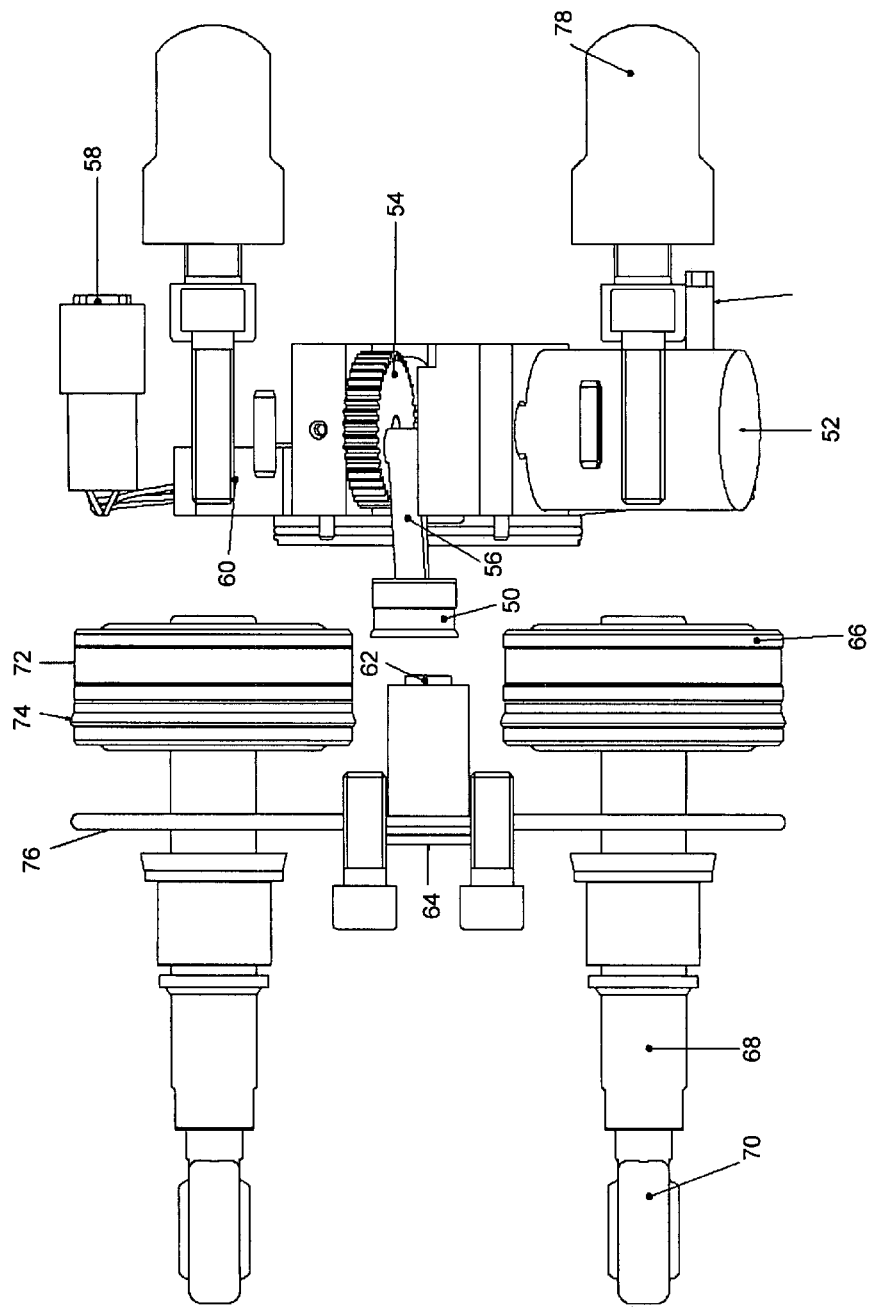
FIG. 5 is an elevated perspective assembly of a device according to an embodiment of the present invention.
Figure 6:
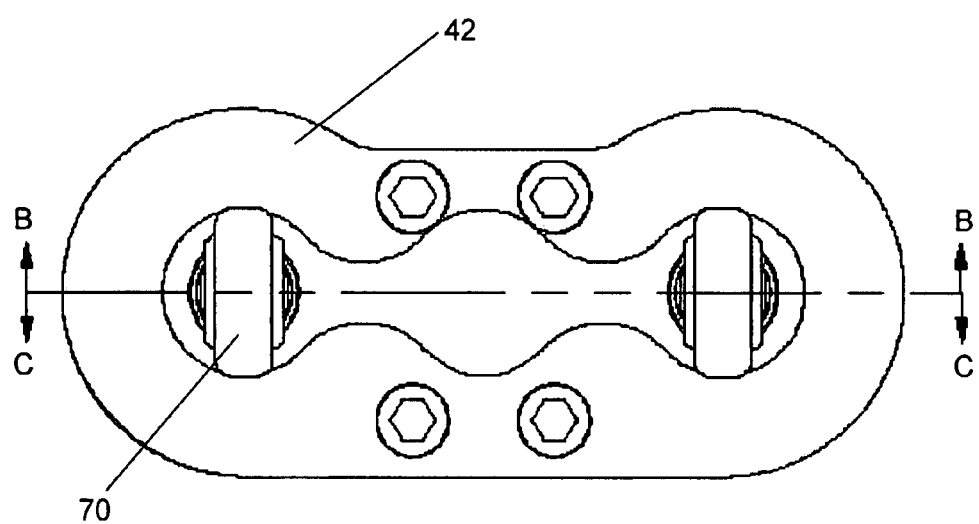
FIG. 6 is an end view of a device according to an embodiment of the present invention.
Figure 7:
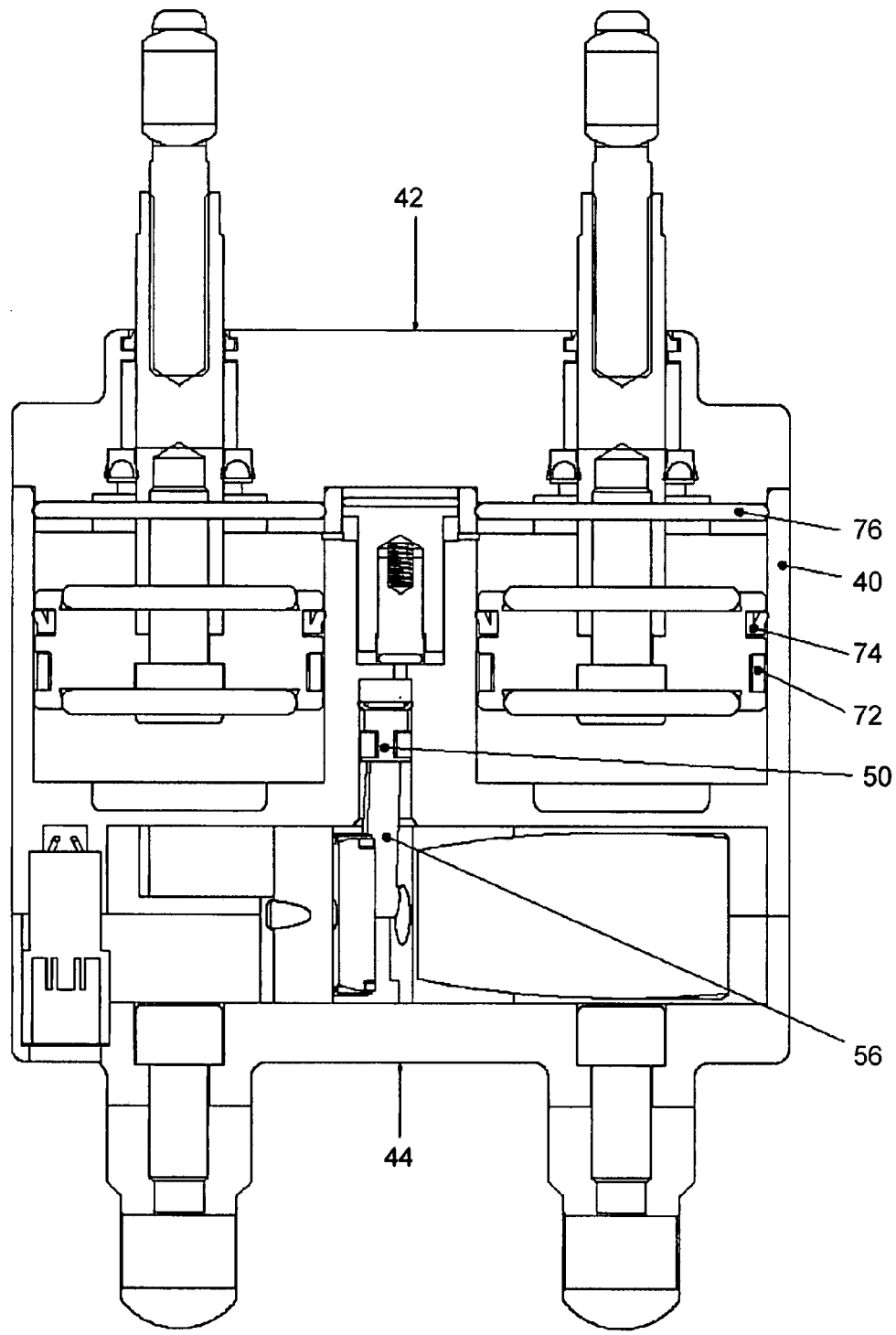
FIG. 7 is a cutaway front view of a device according to an embodiment of the present invention taken along cut line B-B of FIG. 6.
Figure 8:
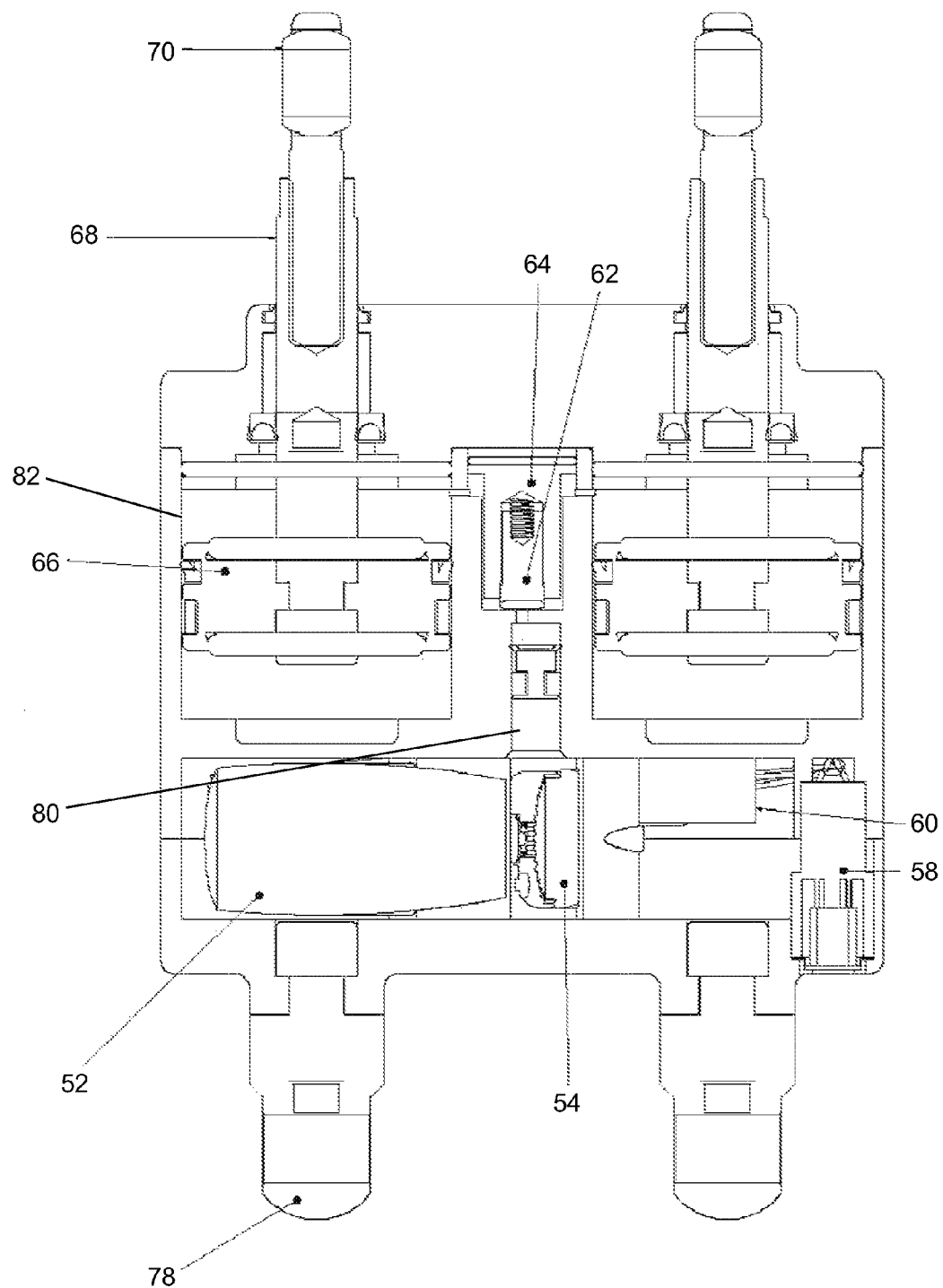
FIG. 8 is a cutaway rear view of a device according to an embodiment of the present invention taken along cut line C-C of FIG. 6.

An air suspension device according to the present invention includes a housing 10. The present invention includes a number of air chambers and air ports, described in greater detail below. In an optional embodiment, the air chambers and air ports described below are integral with the housing 10. For example, in one optional embodiment, the housing 10 is a block or block assembly in which the air chambers and air ports are bored in the block or block assembly forming the housing 10. In other words, in one such optional embodiment, the walls of the air chambers and air ports are formed by the housing 10 itself rather than being separate from the housing 10. In an optional embodiment, shown in FIG. 4, the housing may be assembled from separate components, including a cylinder housing 40, a rod/swing arm end 42, and a frame end 44.

Referring generally to FIGS. 1-3, the housing 10 encloses a compressor chamber 12. As noted above, in an optional embodiment, the compressor chamber 12 is bored through the housing 10. The compressor chamber 12 includes a compressor 14 disposed therein and is terminated at an opposing end with a check valve 26. As illustrated in FIG. 1, in an optional embodiment, the compressor 14 is a piston connected to a power source. The connection from the compressor 14 to a power source could be direct or could occur through a linkage 16 as shown in the optional embodiment of FIG. 1. While the power source could take any form, in the optional embodiment of FIG. 1, the power source is an electric motor 18. In one such optional embodiment, wires to the motor 18 may terminate in a connector (not shown) that mates with a connector supplying electrical power to the motor 18 and actuates the motor 18 through, for example, a switch. As may be appreciated, gears may be used to match the rate of rotation of the motor 18 to a desired compressor 14 cycle. The functioning of the compressor 14 is described in greater detail below.

The compressor chamber 12 communicates with one or more piston chambers 20. It is noted that any number of compressor chambers 12 and any number of piston chambers 20 may be provided. As shown in FIGS. 1 and 2, one optional embodiment includes a single compressor chamber 12 communicating with two piston chambers 20. The communication between the compressor chamber 12 and the piston chambers 20 could take any form, but in an optional embodiment the compressor chamber 12 communicates with each piston chamber 20 through an internal air port 22 bored through the housing 10 so that external air lines, fittings, and joints, all of which could potentially leak, are not needed.

The compressor chamber 12 communicates with an air source. Although the air source may take many different forms, in the optional embodiment of FIGS. 1 and 2 the compressor chamber 12 communicates with ambient air. As may be appreciated, a valve may be provided so that the communication between the compressor chamber 12 and ambient air is open when the compressor 14 draws air into the compressor chamber 12 but is closed when the compressor 14 delivers air under pressure to one or more piston chambers 20.

In an optional embodiment, a valve is provided to release air from the compressor chamber 12. Optionally, the valve is a solenoid valve 24, that is, a valve that is electrically actuated. In an optional embodiment, a restricting valve may be provided to control the rate of air release when the solenoid valve 24 is actuated to release air from the compressor chamber 12. In an optional embodiment, the wires passing to the solenoid valve 24 may terminate in a connector (not shown) that mates with a connector supplying power and controlling a switch to actuate the solenoid valve 24. It is contemplated that the motor 18, if any, and the solenoid valve 24, may be powered from a shared source or from separate sources. For example, in the optional embodiment of FIG. 1, a solenoid valve 24 may be disposed in series with a motor 18.

Referring generally to FIG. 2, disposed in each piston chamber 20 is a piston 28 having a piston rod 30 extending from the piston 28. Optionally, the piston rod 30 extends outside the housing 10 so that the air suspension device may be attached to the motor vehicle through the piston rods 30. Optionally, mounting holes 32 are provided in the piston rods 30 to facilitate mounting. In one such optional embodiment, the housing 10 also includes mounts 34 for securing the air suspension device to the motor vehicle. Again, the mounts 34 may include mounting holes 36 to facilitate mounting. In one example of the use of the air suspension device, the mounts 34 on the housing 10 are secured to the frame of a motor vehicle while the piston rods 30 are secured to a wheel assembly.

Referring to FIGS. 1 and 2, in an optional embodiment, the compressor chamber 12 communicates with the piston chamber 20 on the side of the piston 28 proximate the piston rod 30. In such an optional configuration, compressed air delivered to the piston chamber 20 from the compressor chamber 12 by the compressor 14 tends to force the piston 28, and consequently the piston rod 30, into the piston chamber 20 and resist an opposing force. Optionally, the piston 28 and piston rod 30 cooperate with seals 38 to reduce the leakage of air around the piston 28 and piston rod 30. Referring to FIG. 3, a vent 40 may communicate with the piston chambers 20. Optionally, a relief valve (not shown) may be disposed in the vent 40 to control the rate at which air passes through the vent 40.

In use, air is drawn by the compressor 14 into the compressor chamber 12 and forced, under pressure, into the piston chamber 20. As noted above, in one optional embodiment, the compressor 14 is driven by a motor 18 actuated from a switch, remote, or the like. To release the air, a valve, optionally a solenoid valve 24, is actuated to release air from the compressor chamber 12. In an optional embodiment, the solenoid valve 24 is actuated from a switch, remote, or the like.

An alternate optional embodiment is shown in FIGS. 4-8. In this optional embodiment, the compressor piston 50 moves in a compressor chamber 80 that is parallel to the direction of the piston chamber 82. In one such optional embodiment, the compressor piston 50 is driven by a compressor motor 52 linked to the compressor piston 50 via a compressor gear 54 and a connecting rod 56. Optionally, the compressor motor 52 is powered and actuated via an electrical plug 58 leading to a solenoid 60.

Compressed air is transmitted from the compressor through an air valve 62 and air valve body 64 to the piston chambers 82. As previously discussed, the compressed air in the piston chambers 82 support the pistons 66. This support acts as an air suspension via the piston shaft 68 and rod end 70. As may be appreciated, the piston 66 may include various rings 72 and/or seals 74 on its surface to prevent air from escaping around the piston 66. Similarly, a rings 76 or seals may be provided to prevent compressed air from escaping the piston chambers 82. Mounts 78 may secure the air suspension device to the motor vehicle.

While certain embodiments of the present invention have been shown and described it is to be understood that the present invention is subject to many modifications and changes without departing from the spirit and scope of the invention presented herein.

I claim:

1. An air suspension device for a motorcycle including a wheel assembly comprising:
   - a housing, said housing enclosing a compressor chamber such that said compressor chamber is internal to said housing, said compressor chamber in communication with an air source, said housing further enclosing a piston chamber such that said piston chamber is internal to said housing, said piston chamber in communication with said compressor chamber via a port, said housing including a frame mount;
   - a compressor disposed in said compressor chamber such that said compressor is internal to said housing, said compressor adapted to receive air from said air source and deliver said air to said piston chamber under pressure;
   - a check valve disposed between said compressor chamber and said piston chamber; and
   - a piston disposed in each piston chamber, said piston including a piston rod extending through said housing, said piston rod adapted to mount to said wheel assembly of said motor cycle.

2. The device of claim 1 wherein said port is internal to said housing.

3. The device of claim 1 wherein said compressor comprises a piston.

4. The device of claim 3 wherein said compressor further comprises a power source in communication with said compressor, said power source adapted to deliver power to said compressor.

5. The device of claim 4 wherein said power source comprises a motor linked to said piston.

6. The device of claim 1 further comprising a solenoid valve in communication with said compressor chamber, said solenoid valve adapted to move between an open and a closed position in response to an electrical signal to thereby control the flow of compressed air from said compressor chamber to said piston chamber.

7. The device of claim 6 further comprising a restricting valve in communication with said compressor chamber, said restricting valve adapted to control the rate of flow of compressed air from the compressor chamber when said solenoid valve is in an open position.

8. The device of claim 1 wherein said port is disposed in said housing with one end at said piston chamber proximate the piston rod such that compressed air introduced into the piston chamber by said compressor forces said piston and piston rod into said piston chamber.

9. The device of claim 1 further comprising a vent in said piston chamber opposite said piston rod.

10. The device of claim 9 further comprising a relief valve disposed in said vent, said relief valve adapted to control the flow of air out of said piston chamber through the vent.

11. An air suspension device for a motorcycle including a wheel assembly comprising:
   a housing, said housing enclosing a compressor chamber such that said compressor chamber is internal to said housing, said compressor chamber in communication with an air source, said housing further enclosing a piston chamber such that said piston chamber is internal to said housing, said piston chamber in communication with said compressor chamber via a port internal to said housing, said housing including a frame mount;
   a compressor disposed in said compressor chamber such that said compressor is internal to said housing, said compressor adapted to receive air from said air source and deliver said air to said piston chamber under pressure;
   a check valve disposed between said compressor chamber and said piston chamber; and
   a piston disposed in each piston chamber, said piston including a piston rod extending through said housing, said piston rod adapted to mount to said wheel assembly of said motor cycle.

12. The device of claim 11 wherein said compressor comprises a piston.

13. The device of claim 12 wherein said compressor further comprises a power source in communication with said compressor, said power source adapted to deliver power to said compressor.

14. The device of claim 13 wherein said power source comprises a motor linked to said piston.

15. The device of claim 11 further comprising a solenoid valve in communication with said compressor chamber, said solenoid valve adapted to move between an open and a closed position in response to an electrical signal to thereby control the flow of compressed air from said compressor chamber to said piston chamber.

16. The device of claim 15 further comprising a restricting valve in communication with said compressor chamber, said restricting valve adapted to control the rate of flow of compressed air from the compressor chamber when said solenoid valve is in an open position.

17. The device of claim 11 wherein said port is disposed in said housing with one end at said piston chamber proximate the piston rod such that compressed air introduced into the piston chamber by said compressor forces said piston and piston rod into said piston chamber.

18. The device of claim 11 further comprising a vent in said piston chamber opposite said piston rod.

19. The device of claim 18 further comprising a relief valve disposed in said vent, said relief valve adapted to control the flow of air out of said piston chamber through the vent.

20. An air suspension device for a motorcycle including a wheel assembly comprising:
   a housing, said housing enclosing a compressor chamber such that said compressor chamber is internal to said housing, said compressor chamber in communication with an air source, said housing further enclosing a piston chamber such that said piston chamber is internal to said housing, said piston chamber in communication with said compressor chamber via a port, said housing including a frame mount;
   a compressor disposed in said compressor chamber such that said compressor is internal to said housing, said compressor adapted to receive air from said air source and deliver said air to said piston chamber under pressure;
   a check valve disposed between said compressor chamber and said piston chamber;
   a piston disposed in each piston chamber, said piston including a piston rod extending through said housing, said piston rod adapted to mount to said wheel assembly of said motor cycle; and
   a vent in said piston chamber opposite said piston rod.

* * * * *